US012605709B2

United States Patent
Hwang

(10) Patent No.: US 12,605,709 B2
(45) Date of Patent: Apr. 21, 2026

(54) DISPOSABLE SEPARATION CHIP

(71) Applicant: GENOBIO, INC., Seoul (KR)

(72) Inventor: Ju Hyun Hwang, Seoul (KR)

(73) Assignee: GENOBIO, INC., Seoul (KR)

( * ) Notice: Subject to any disclaimer, the term of this patent is extended or adjusted under 35 U.S.C. 154(b) by 500 days.

(21) Appl. No.: 17/928,272

(22) PCT Filed: Oct. 17, 2022

(86) PCT No.: PCT/KR2022/015675
§ 371 (c)(1),
(2) Date: Nov. 28, 2022

(87) PCT Pub. No.: WO2023/068684
PCT Pub. Date: Apr. 27, 2023

(65) Prior Publication Data

US 2024/0116052 A1 Apr. 11, 2024

(30) Foreign Application Priority Data

Oct. 18, 2021 (KR) ........................ 10-2021-0138208

(51) Int. Cl.
*G01N 35/00* (2006.01)
*B01L 3/00* (2006.01)
*G01N 35/08* (2006.01)

(52) U.S. Cl.
CPC . *B01L 3/502761* (2013.01); *B01L 2200/0668* (2013.01); *B01L 2200/0684* (2013.01);
(Continued)

(58) Field of Classification Search
None
See application file for complete search history.

(56) References Cited

U.S. PATENT DOCUMENTS

2010/0123457 A1* 5/2010 Shinoda ................. G01N 15/10
324/228
2010/0240041 A1* 9/2010 Matsunaga .......... C12Q 1/6841
435/6.15

(Continued)

FOREIGN PATENT DOCUMENTS

DE 202010001422 U1 * 4/2010 ............ F16L 37/004
JP 2007165653 A 6/2007

(Continued)

*Primary Examiner* — Maris R Kessel
*Assistant Examiner* — Madison Taylor Herbert
(74) *Attorney, Agent, or Firm* — STIP Law Group, LLC

(57) ABSTRACT

The present invention relates to a disposable separation chip used when separating magnetic beads present in a mixed solution using magnetic force.
The present invention provides disposable separation chip including a lower chip on which a wire pattern having a parabolic shape from one side to another side thereof is formed; and a separation chip separable from the lower chip, wherein the separation chip includes: an upper plate on which a coupling portion coupled to a tubing is formed; and a first member disposed under the upper plate and coupled to a lower surface of the upper plate, wherein the coupling portion is integrally produced with the upper plate wherein it is formed through the upper surface and the lower surface of the upper plate to be connected to a channel.

14 Claims, 13 Drawing Sheets

(52) U.S. Cl.
CPC ... *B01L 2200/16* (2013.01); *B01L 2300/0654* (2013.01); *B01L 2300/0681* (2013.01); *B01L 2300/0819* (2013.01); *B01L 2300/0858* (2013.01); *B01L 2300/0864* (2013.01); *B01L 2300/088* (2013.01); *B01L 2400/043* (2013.01)

(56) References Cited

U.S. PATENT DOCUMENTS

| | | | | |
|---|---|---|---|---|
| 2019/0255528 | A1* | 8/2019 | Lee | B01L 3/502776 |
| 2020/0179932 | A1* | 6/2020 | Williams | B01L 3/502738 |

FOREIGN PATENT DOCUMENTS

| | | | | | |
|---|---|---|---|---|---|
| JP | 5928892 | B2 | | 6/2016 | |
| KR | 20100087828 | A | * | 8/2010 | B01L 3/502761 |
| KR | 101559161 | B1 | | 11/2015 | |
| KR | 101667351 | B1 | * | 10/2016 | B03C 1/0332 |
| KR | 20180009377 | A | | 1/2018 | |
| KR | 20190070635 | A | * | 6/2019 | B01L 3/502715 |

* cited by examiner

【Figure 1】
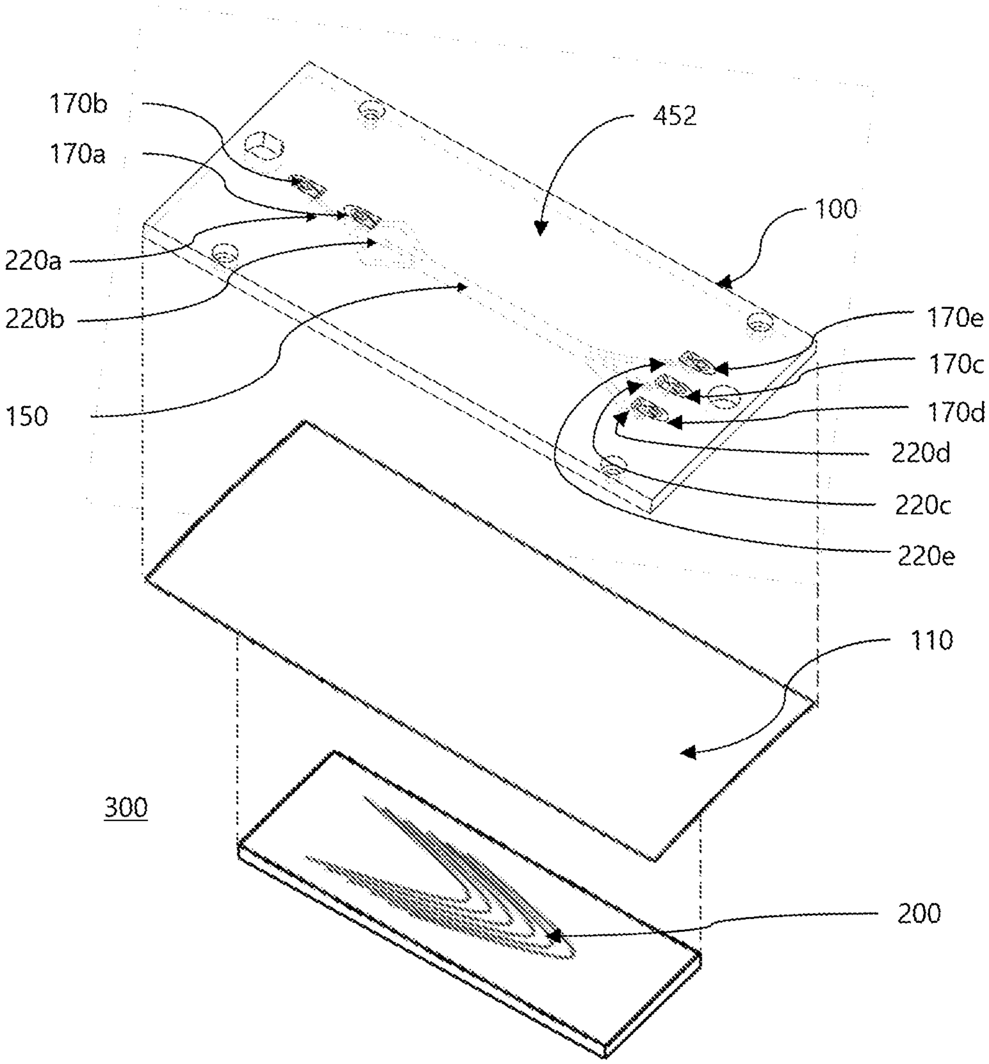

【Figure 2】
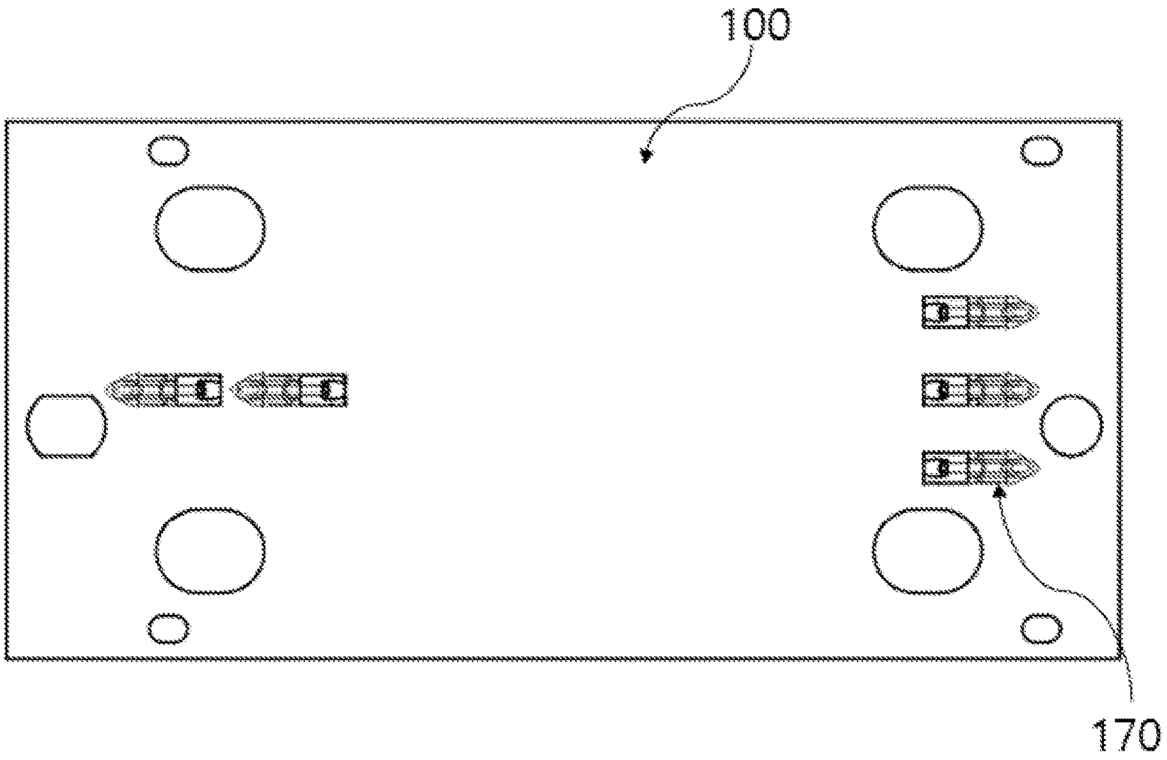
【Figure 3】
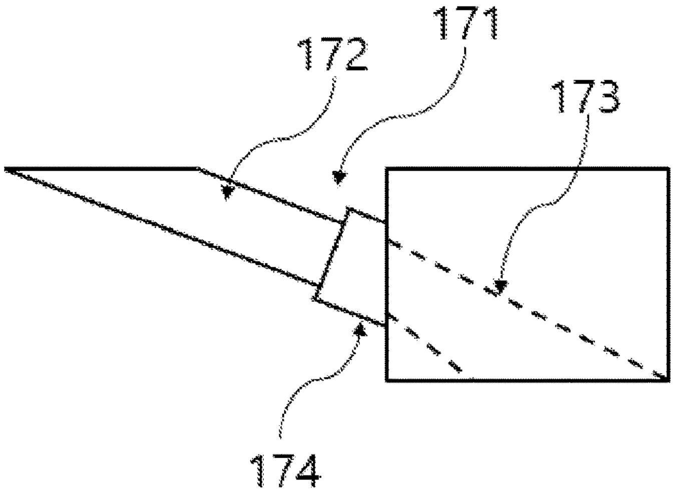

【Figure 4】
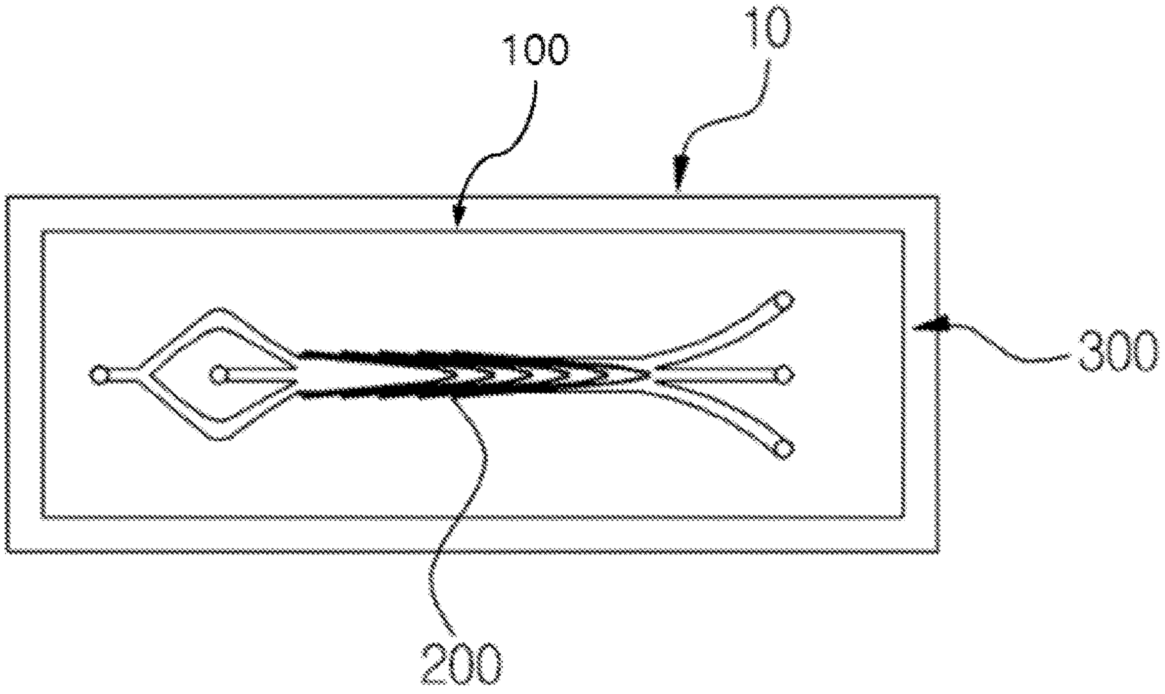

【Figure 5】
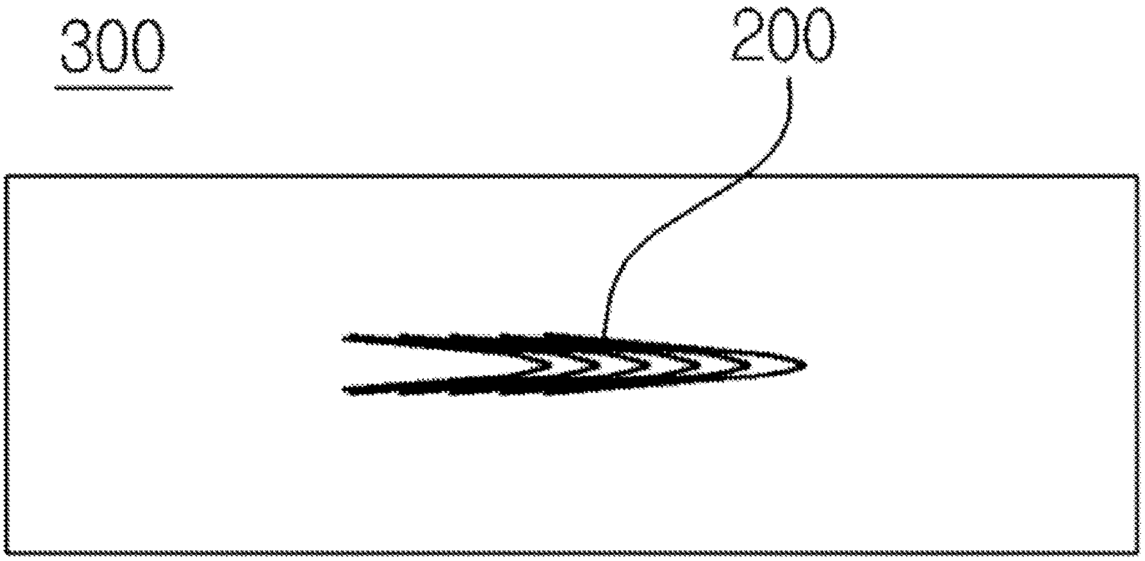

【Figure 6】
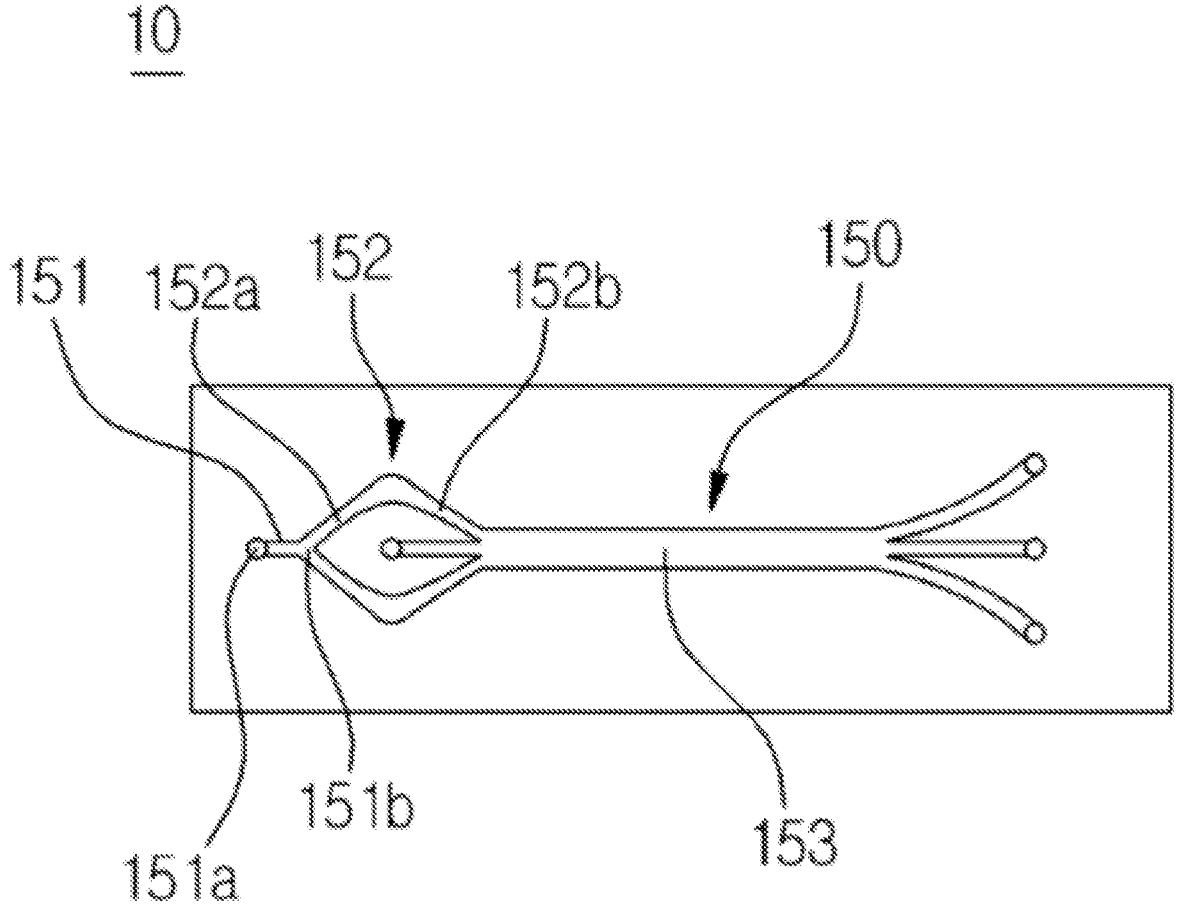

【Figure 7】
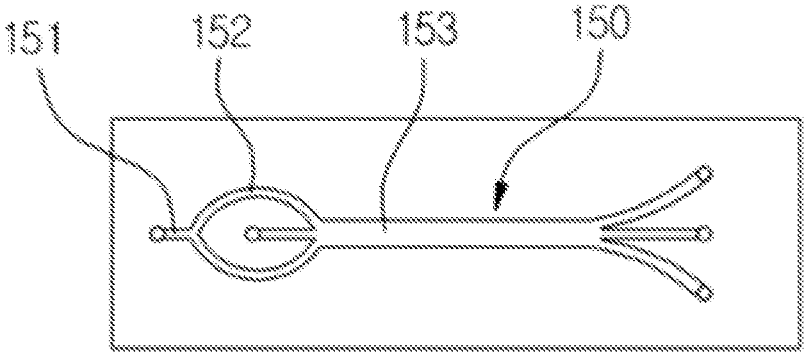
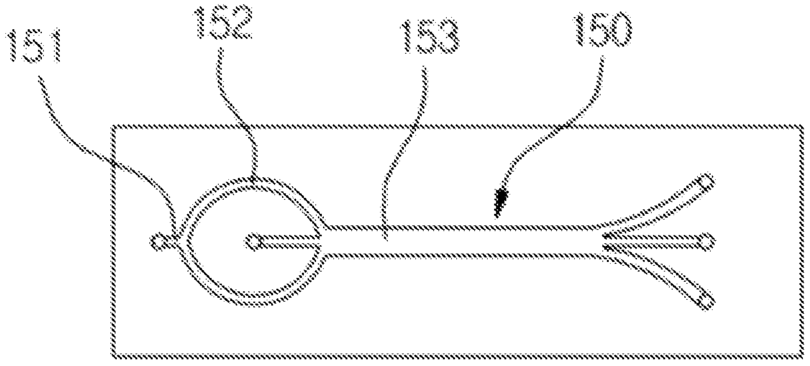

【Figure 8】
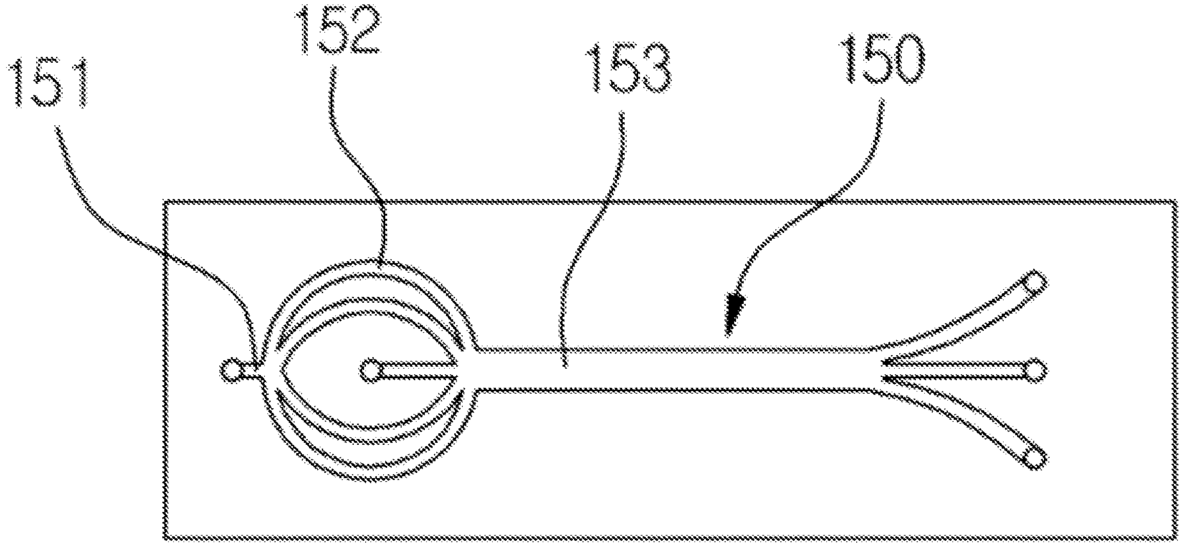

【Figure 9】
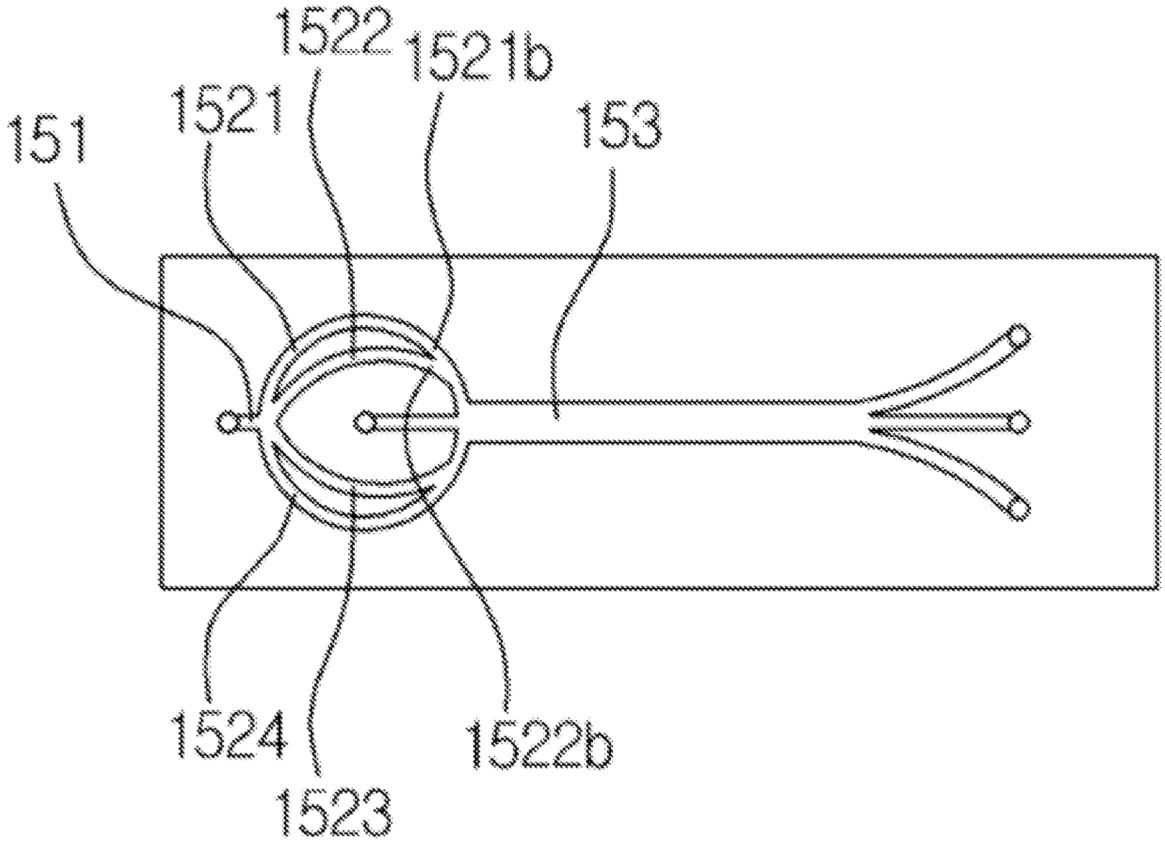

【Figure 10】
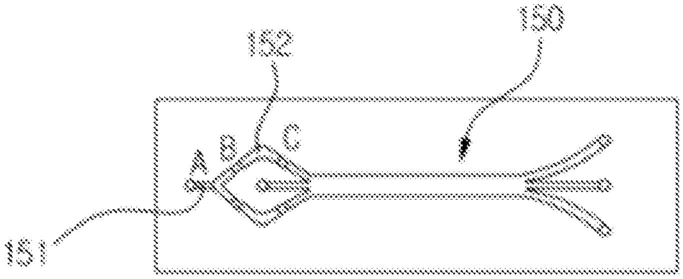
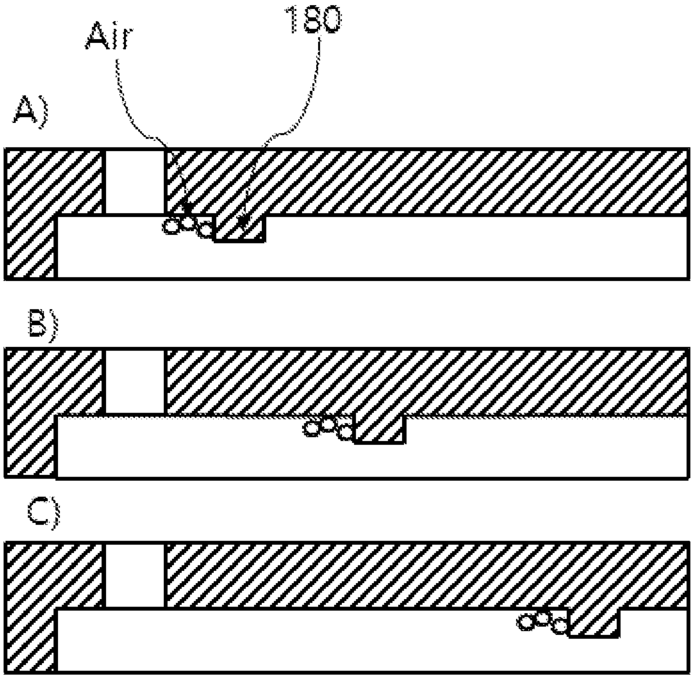

【Figure 11】
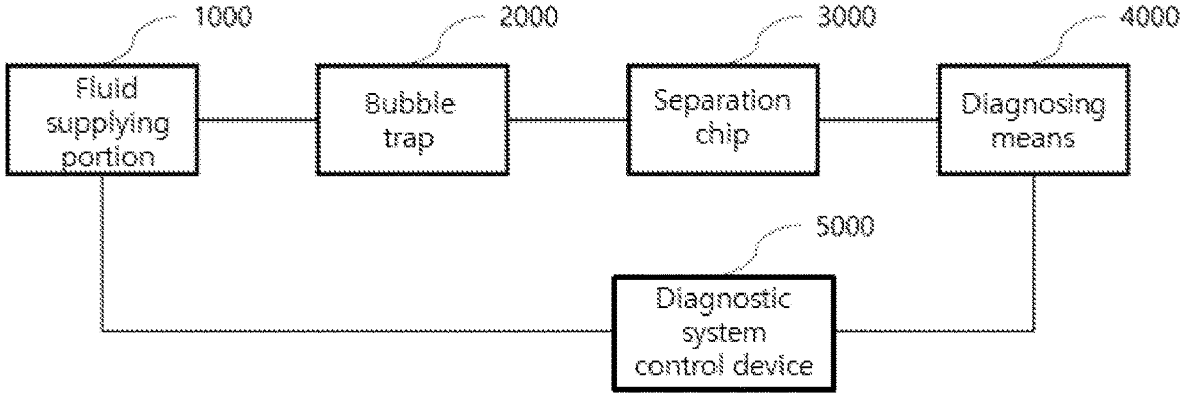

【Figure 12】
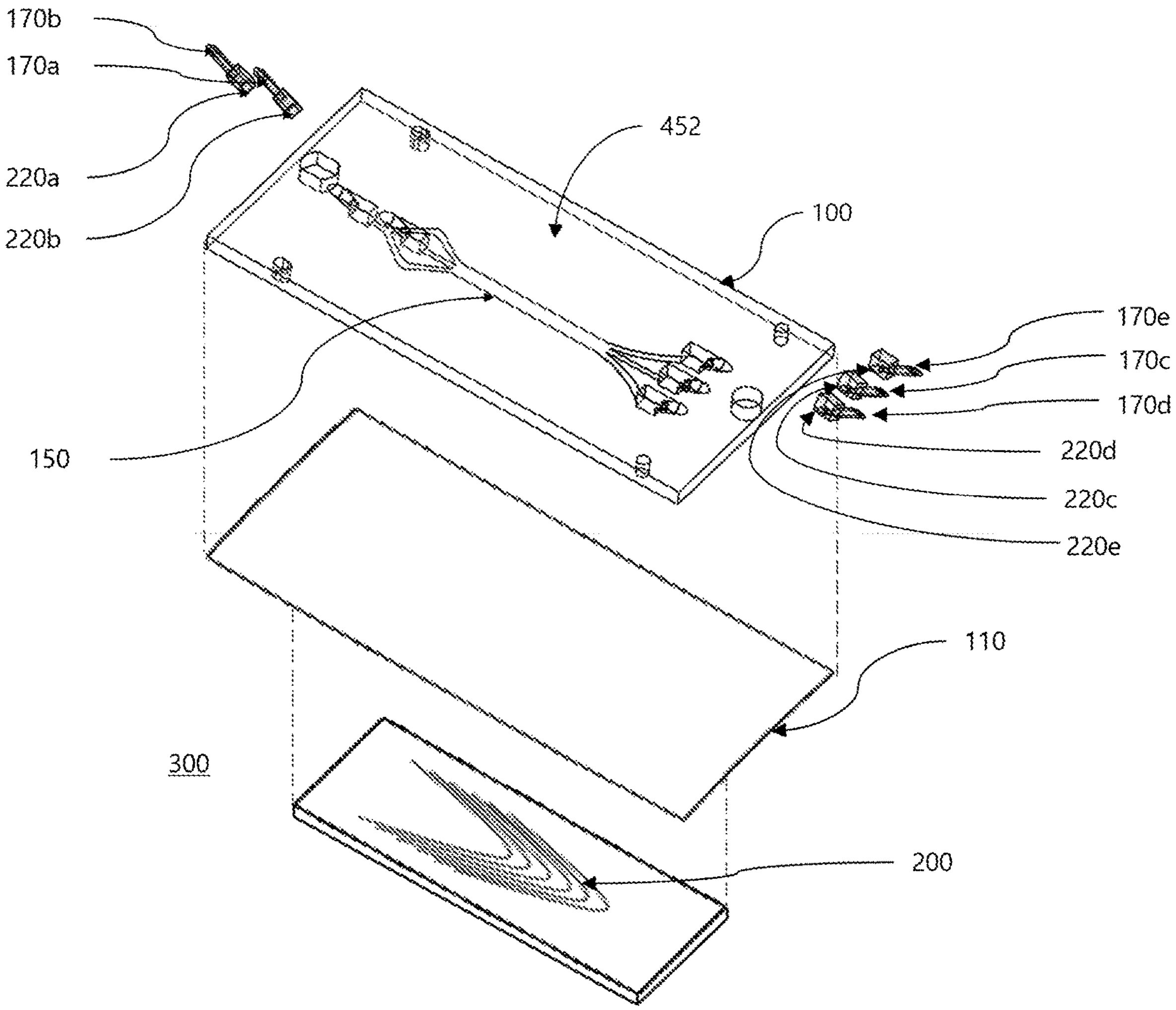

[FIGURE 13]
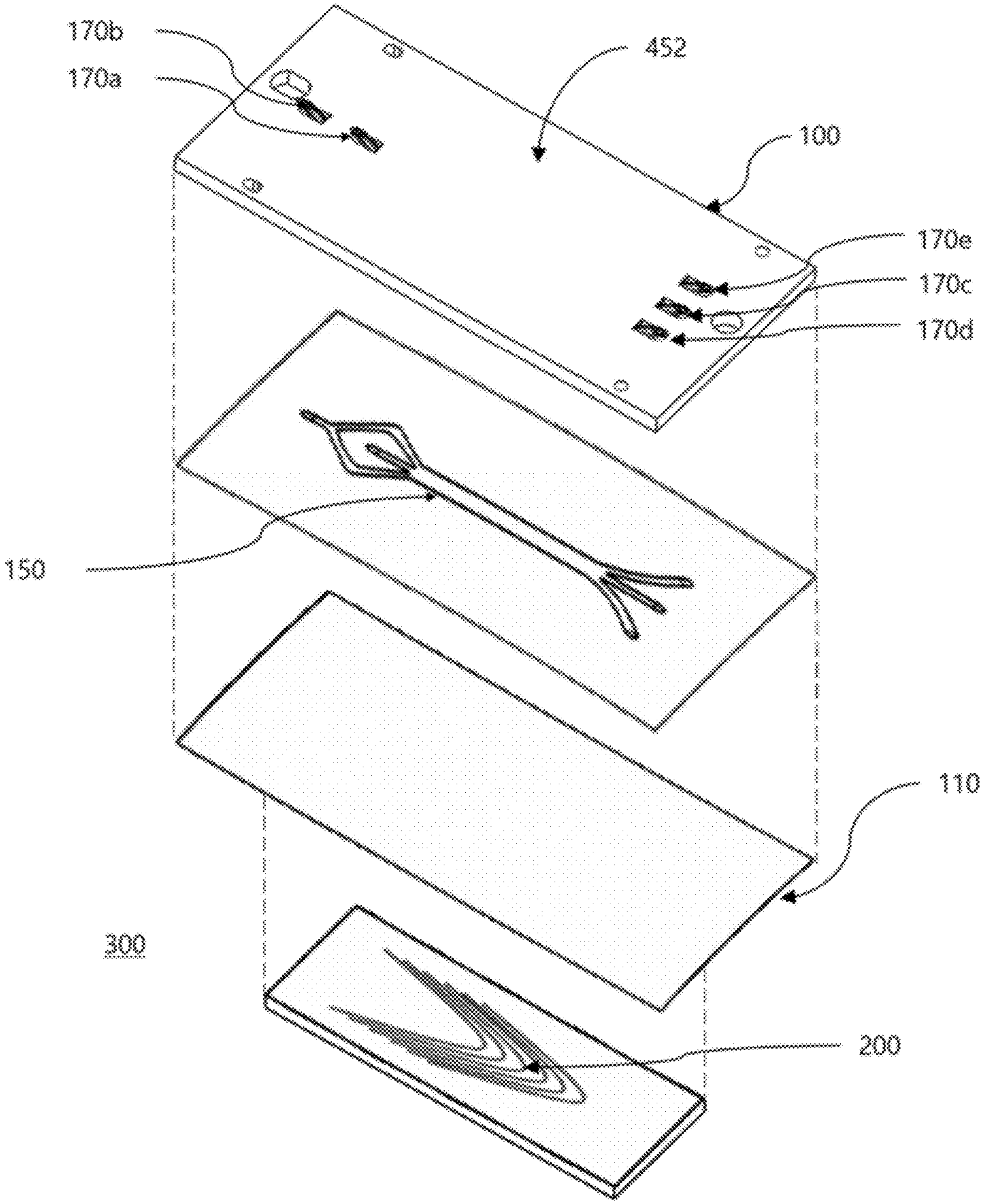

[FIGURE 14]
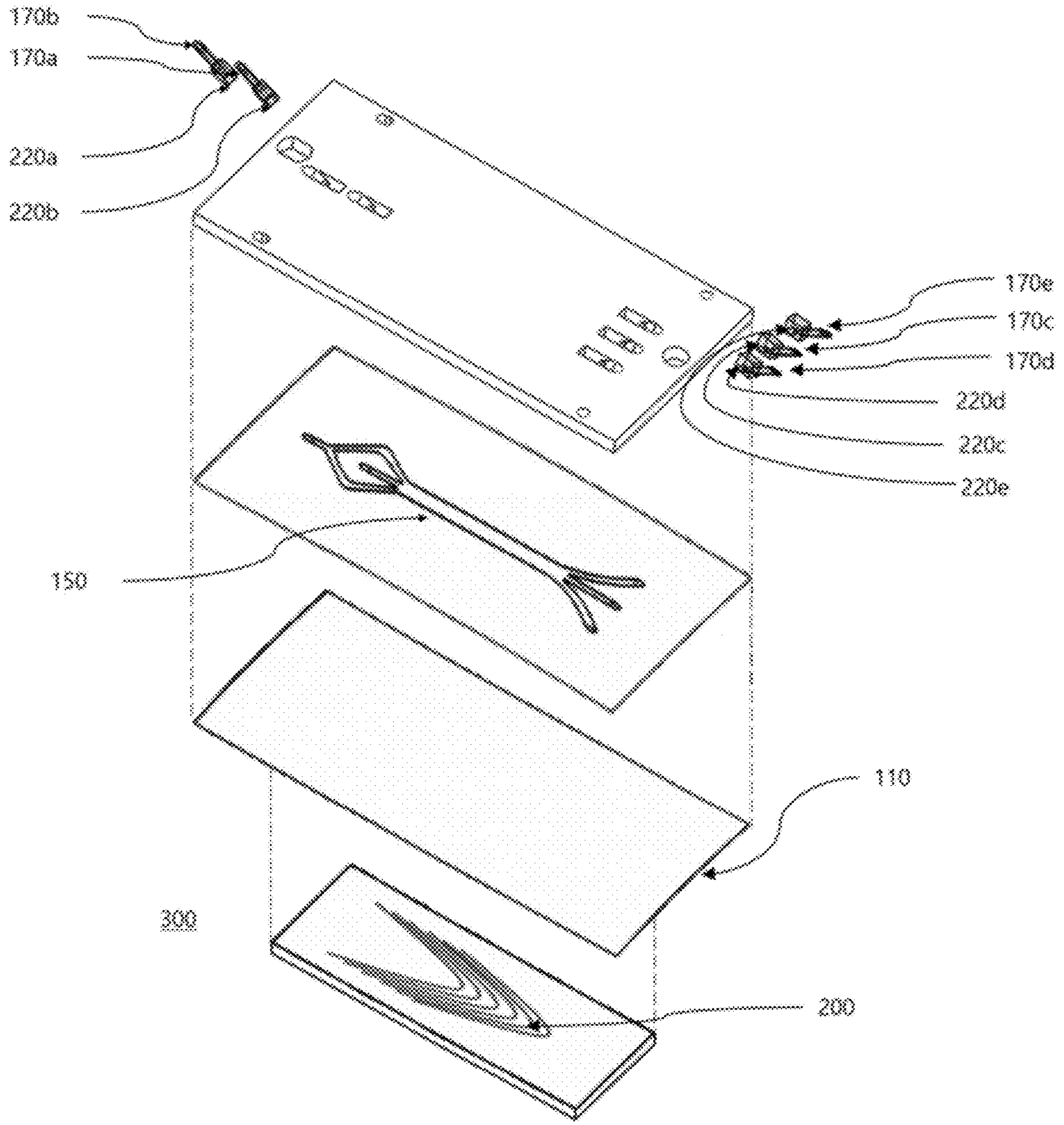

DISPOSABLE SEPARATION CHIP

CROSS-REFERENCE TO RELATED APPLICATIONS

This application is the U.S. National Phase under 35 U.S.C. § 371 of International Application No. PCT/KR2022/015675, filed on Oct. 17, 2022, which in turn claims the benefit of Korean Application No. 10-2021-0138208, filed on Oct. 18, 2021, the disclosures of which are incorporated by reference into the present application.

TECHNICAL FIELD

The present invention relates to a disposable separation chip, and more specifically to a disposable separation chip used to separate magnetic beads present in a mixed solution by using magnetic force.

BACKGROUND ART

Blood circulates through blood vessels of a human or an animal, transports oxygen from a lung to tissue cells and carbon dioxide from tissues to a lung, and releases the carbon dioxide outside. In addition, blood transports nutrients absorbed from alimentary canal to internal organs or tissue cells, and transports unnecessary substances of a body, which is a decomposition product of tissues, to a kidney to release it outside the body, and further transports hormone secreted by endocrine glands to acting organs and tissues.

Meanwhile, circulating tumor cells collectively refer to cancer cells present in peripheral blood of a cancer patient, which are cancer cells dropped out of a primary lesion or a metastatic lesion. These circulating tumor cells are expected to be a potent biomarker in a cancer diagnosis, an analysis of therapeutic prognosis, and an analysis of micro metastasis. In addition, the circulating tumor cell analysis has an advantage of being a non-invasive method in comparison with the conventional cancer diagnosis method, and thus is very promising as a future cancer diagnosis method.

However, since the ratio of circulating tumor cells distributed in blood is at the very low level of 1 cancer cell per 1 billion cells in total or 1 cancer cell per 106 to 107 white blood cells, the accurate analyze is very difficult and a highly sophisticated analysis method is required.

The biggest issue in a cell separation method currently used for the cancer diagnosis and the blood cell analysis is productivity and efficiency. That is, a fast separation rate and a high separation efficiency are required.

To satisfy the productivity issue, the conventional techniques mainly used a method of filtering cells through a mechanical structure. On the other hand, methods of separating cells using electric field, density, and the like have been disclosed, but most of the methods have a limitation that the issue of productivity is not satisfied. In addition, the use of the mechanical structure causes a problem that cells are attached to the structure or an extraction of separated cells is difficult. Therefore, the method has high separation rate, but has an additional problem that the separation efficiency is degraded.

To solve the problem of the cell separation method using a mechanical structure, a cell separation method using magnetism has been disclosed.

First, magnetic nano particles bound with antibody that specifically reacts to cancer cells (referred to as magnetic beads) and blood to be examined are mixed to prepare a mixed solution including the cancer cells to which the magnetic nano particles are bound. Among the conventional techniques in which the mixed solution and a buffer solution (for example, distilled water) are flowed into a chip, in which a channel is formed, to control each flow according to the viscosity of a fluid and separate cancer cells in blood from blood by driving a magnet, a technique using a wire pattern (Prior Document 1) is as follows.

That is, according to Prior Document 1, ferromagnetic wires are configured to be spaced apart from a channel surface of a microfluid channel for separation. Prior Document 1 has a lower chip configuration including the ferromagnetic wires as a magnetic structure. For reference, a combination of nickel (Ni), iron (Fe), cobalt (Co), and molybdenum (Mo) is used as the ferromagnetic wire alloy. A microfluid channel pattern is formed on an upper chip. The upper chip is integrally attached to the lower chip including the ferromagnetic wires using UV adhesion or plasma adhesion, thereby completing an apparatus for separating and capturing fine particles using magnetic flux.

However, in the case of Prior Document 1, there are the following problems.

1) For a chip used in Prior Document 1, a wire pattern to which the semiconductor technology is basically applied is used.

That is, a photoresist is removed, an epoxy adhesive is coated, and a surface is flattened, that is, the process of manufacturing the lower chip including the ferromagnetic wires as a magnetic structure is included, and accordingly, the manufacturing cost for the chip is very high.

2) In the process of washing to recycle the chip used once, when washing the inside of the chip in damage to the wire pattern and the presence of residue after washing are problematic.

3) The residue remaining inside the chip in the process of washing the chip acts as an obstacle when separating the magnetic beads.

4) Since the semiconductor technology or the MEMS technology are used in manufacturing the upper chip, the process is complex, and the manufacturing cost is high.

5) The upper chip and the lower chip are integrally attached by using such a method as the UV adhesion or the plasma adhesion, and thus it is difficult to separate the upper chip and the lower chip.

Therefore, there is need for a new separation chip to improve these problems.

DISCLOSURE

Technical Problem

To solve the above problems, the present invention is to provide a disposable separation chip with a low manufacturing cost of the chip and thus is economical.

Technical Solution

To solve the problems described above, in an aspect, the present invention provides a disposable separation chip including a lower chip on which a wire pattern having a parabolic shape from one side to another side thereof is formed; and a separation chip separable from the lower chip, wherein the separation chip includes an upper plate on which a coupling portion coupled to a tubing is formed; and a first member disposed under the upper plate and coupled to a lower surface of the upper plate, wherein the coupling portion is integrally produced with the upper plate wherein it is formed through the upper surface and the lower surface of the upper plate to be connected to a channel.

In one embodiment, the coupling portion may include: a depression portion formed on the upper surface of the upper plate; a pipe portion located inside the depression portion and inserted into the tubing; and a connection portion for connection such that an inner circumferential surface of the pipe portion extends to be connected to the channel.

In one embodiment, the pipe portion may form an acute angle with respect to the upper surface of the upper plate.

In one embodiment, a stopper portion having a diameter equal to or greater than the tubing is formed at an outer circumferential surface of the pipe portion such that the tubing may be inserted at a predetermined depth.

In another aspect, the present invention provides disposable separation chip including a lower chip on which a wire pattern having a parabolic shape from one side to another side thereof is formed; and a separation chip separable from the lower chip, wherein the separation chip includes: an upper plate on which a coupling portion coupled to a tubing is formed; and a first member disposed under the upper plate and coupled to a lower surface of the upper plate, wherein the coupling portion is integrally produced with the upper plate wherein it is formed through the upper surface and the lower surface of the upper plate to be connected to the channel, and wherein a channel of a groove shape is formed on a lower portion of the upper plate.

In one embodiment, the lower surface of the upper plate may be produced as a curved shape of which a radius of curvature is 500 to 1000 mm, and a thickness of a center portion is thicker than opposite side surfaces thereof.

In one embodiment, a pressing means may be included at an upper end and a lower end of the opposite site surfaces of the upper plate.

In one embodiment, the channel may include: a first channel; a second channel being connected to the first channel, being branched into multiple, and including a first portion and a second portion being connected to the first portion, wherein a width of the first portion increases gradually toward the second portion, and wherein a width of the second portion decreases gradually toward a third channel being connected to the second channel.

In one embodiment, the channel may include: a first channel; a second channel being connected to the first channel and being branched into multiple, wherein the second channel is formed with an arc shape.

In one embodiment, the channel may include: a first channel; a second channel being connected to the first channel and being branched into multiple, wherein a plurality of protrusions is disposed on the first channel or the second channel.

In one embodiment, the protrusion may include a first protrusion and a second protrusion located below or at a side of the first protrusion.

In one embodiment, a filter may be disposed on the channel.

In one embodiment, the filter may be connected to the channel and have a predetermined space.

In still another aspect, the present invention provides a disposable separation chip including a lower chip on which a wire pattern having a parabolic shape from one side to another side thereof is formed; and a separation chip separable from the lower chip, wherein the separation chip includes: an upper plate on which a coupling portion coupled to a tubing is formed; and a first member disposed under the upper plate and coupled to a lower surface of the upper plate, wherein the coupling portion is integrally formed with the upper plate and formed through the upper surface and the lower surface of the upper plate to be connected to a channel, wherein a channel of a groove shape is formed on a lower portion of the upper plate, and wherein the lower chip and the separation chip may be manufactured of plastic.

In one embodiment, the plastic may be a transparent polycarbonate.

In still another aspect, the present invention provides a microfluidic based diagnostic system comprising the disposable separation chip.

In one embodiment, the microfluidic based diagnostic system may include: a fluid supplying portion for supplying a buffer solution or a microfluid; a microfluidic bubble trap for removing bubbles included in the fluid supplied from the fluid supplying portion; a separation chip for mixing or separating the fluid passing through the microfluidic bubble trap; a diagnosing means for analyzing the microfluid passing through the separation chip; and a diagnostic system control device for controlling the diagnostic system.

Advantageous Effects

The disposable separation chip according to the present invention has the following advantages.

(1) An upper chip and a lower chip are dividable, and thus only the upper chip is discarded after an examination is completed, and accordingly, a washing process is not required.

(2) The upper chip may be manufactured using a relatively simple method other than semiconductor technology or MEMS technology, and accordingly, the manufacturing cost is saved and the mass production is easy, and thus is economical.

(3) The separation chip is discarded after one use, and thus the problem of an examination error owing to residues does not occur.

(4) The mass production is available, and accordingly, a constant quality of the disposable separation chip according to the present invention may be guaranteed.

(5) A fluid flows into a channel through a pipe formed in the upper chip, and a fluid injection into the channel is stable, and accordingly, the turbulence of a tubing does not influence the fluid flow.

(6) An angle is formed in the pipe of the upper chip, and thus the durability of the chip is improved.

(7) An insertion portion of the tubing is integrally formed, and the loss of cells which may occur in a coupling portion may be minimized.

(8) The manufacturing cost may be saved since a channel is integrally formed in an upper plate, and the fault of the separation chip owing to miss-adhesion of a member used for forming a channel may be minimized.

DESCRIPTION OF DRAWINGS

FIG. 1 illustrates a separation chip structure according to an embodiment of the present invention.

FIG. 2 illustrates an upper view of a separation chip structure according to an embodiment of the present invention.

FIG. 3 illustrates a shape of a coupling portion according to an embodiment of the present invention.

FIG. 4 illustrates a plane view of a case that a disposable separation chip and a lower chip according to an embodiment of the present invention.

FIG. 5 illustrates a plane view of a lower chip according to an embodiment of the present invention.

FIG. 6 illustrates a plane view of a case that a channel of a disposable separation chip is expanded according to an embodiment of the present invention.

FIGS. 6 to 9 illustrate plane views of a case that a channel of a disposable separation chip includes a plurality of branched channels according to an embodiment of the present invention.

FIG. 10 illustrates a plane view and a sectional view of a case that a filter of a disposable separation chip is formed according to an embodiment of the present invention.

FIG. 11 schematically illustrates a configuration of a diagnostic system according to an embodiment of the present invention.

FIGS. 12 to 14 illustrate a shape of a separation chip according to an embodiment of the present invention.

BEST MODE

Hereinafter, preferred embodiments of the present invention will now be described in detail. In the description of the present invention, detailed explanations of related art are omitted when it is deemed that they may obscure the essence of the present invention. Throughout the specification, when a portion is described to "include" a certain component, it indicates that it may further include other components, rather than excluding other components, unless specifically stated otherwise.

As the present invention allows for various changes and numerous embodiments, specific embodiments will be illustrated and described in detail in the detailed description. However, it is to be appreciated that this is not intended to limit the present invention to particular embodiments, and includes all changes, equivalents, and substitutes included in the idea and technical scope of the present invention.

The present invention is not limited to the illustrated embodiments and may be embodied in various forms. However, the embodiments introduced herein are provided so that the disclosed content is thorough and complete, and the technical idea of the present technique can be fully conveyed to those skilled in the art. In the drawings, in order to clearly express the component of each device, the dimensions, such as widths and thicknesses, of the above component may be somewhat exaggerated. The drawings are explained from an observer's point of view, and when an element is referred to as being located on another element, it includes both meaning that the one element is located directly on the other element or that additional elements may be interposed between the elements. In addition, those skilled in the art will be able to implement the idea of the present invention in various other forms without departing from the technical idea of the present invention. In addition, the same reference numerals in a plurality of drawings denote elements that are substantially the same as each other.

The terms used herein are used only to describe specific embodiments, and are not intended to limit the present invention. The singular forms include the plural referents unless the context clearly dictates otherwise. In the present invention, it is to be understood that the term "include" or "have" is intended to designate the presence of the features, numbers, steps, operations, components, parts, or combinations thereof described in the specification, but not to preclude the possibility of the presence or addition of one or more other features, numbers, steps, operations, components, parts, or combinations thereof.

Meanwhile, the meaning of terms described herein should be understood as follows. As the terms "first" or "second" are used to distinguish one component from another component, the scope of rights should not be limited by these terms. For example, a first component may be termed a second component, and similarly, a second element may also be termed a first component.

As used herein, the singular forms are intended to include the plural forms as well, unless the context clearly indicates otherwise. In addition, it is to be understood that the singular forms include plural referents unless the context clearly dictates otherwise, and the terms "include" or "have" are intended to designate the presence of the stated features, numbers, steps, operations, components, parts, or combinations thereof, but not to preclude the possibility of the presence or addition of one or more other features, numbers, steps, operations, components, parts, or combinations thereof. In addition, in performing a method or manufacturing method, respective steps consisting of the method may occur in a different order from the specified order unless a specific order is clearly described in context. In other words, the respective steps may occur in the same order as specifically described, or may be substantially simultaneously performed or in the reverse order.

In the present specification, the term "and/or" includes a combination of a plurality of items described and any one of a plurality of items described. In the present specification, 'A or B' may include 'A', 'B', or 'both A and B'.

The present invention relates to a disposable separation chip including a lower chip on which a wire pattern having a parabolic shape from one side to another side is formed; and a separation chip separable from the lower chip, wherein the separation chip includes an upper plate on which a coupling portion coupled to a tubing is formed; and a first member disposed under the upper plate and coupled to a lower surface of the upper plate, the coupling portion is integrally formed with the upper plate and formed through the upper surface and the lower surface of the upper plate to be connected to a channel.

First, the disposable separation chip may include an upper plate 100 and a first member 110.

The upper plate 100 may be manufactured to be similar to a rectangular board of a low height.

The first member 110 may be similar to a plate formed with a very thin thickness compared to its length and width, and may be produced with film or tape.

The first member 110 may be coupled to a lower portion of the upper plate 100. More particularly, the first member 110 may be coupled to the upper plate 100 using an adhesive disposed on a lower surface of the upper plate 100. In this case, since a channel 150 is formed on the lower surface of the upper plate 100, the adhesive may be applied only to a portion except for the channel 150 on the lower surface of the upper plate 100, and the lower surface of the channel 150 thereby may be formed by the first member 110.

The channel 150 may be formed in an intaglio shape in which the lower surface of the upper plate 100 is concavely dug. In this case, the channel may be formed through an embossed shape formed on a mold in an intaglio shape at a corresponding position of the upper plate 100 when producing the upper plate 100, and may also be formed by making the lower surface of the upper plate 100 flat, and then mechanically processing or chemically etching the lower surface. In this case, the channel 150 may be formed in various shapes according to its purpose.

The coupling portion 170 is located on the upper plate and coupled with a tubing, and thus may serve to supply a buffer solution or a microfluid supplied from the tubing to the channel 150. The conventional coupling portion is formed in a shape penetrating the upper portion and the lower portion of the upper plate, and then a pipe is inserted such that the tubing is coupled to the exposed surface of the pipe and used. However, in this case, there is a disadvantage that the three stages of tubing-pipe-penetration portion need to be passed to supply the microfluid to the channel. As is known, loss of cells supplied by the microfluid increases as the number of connecting portions of each component increases. In the case of the present invention, it is possible to minimize the loss of cells by using only two steps of tubing-coupling portion for the connection.

To this end, the coupling portion may include a depression portion formed on the upper surface of the upper plate; a pipe portion located inside the depression portion and inserted into the tubing; and a connection portion for connecting such that an inner circumferential surface of the pipe portion extends to be connected to the channel.

The depression portion 171 is a place where the pipe portion 172 protruding outside is formed, and may be formed in a shape in which a part of the upper plate 100 of the separation chip is depressed. Through this, the pipe portion 172 may be formed to have a short length and thereby can prevent damages thereof caused from protruding outside wherein manufacture and transportation of the separated chip portion may be easy due to its stacking and storing.

The pipe portion 172 is installed extending upward from the lowest point inside the depression portion 171 (see FIG. 2), and as described above, and it is preferably formed such that the height of an uppermost end equals to or is lower than the upper surface of the upper plate 100. In this case, the pipe portion 172 forms preferably an acute angle with respect to the upper surface of the upper plate, and the advantages thereof are as follows.

(1) The durability of the chip itself is increased.

That is, in the case of the chip according to the related art, when a solution is injected into a channel using a syringe or the like for tubing, an angle between an injection hole and syringe is a right angle or close to a right angle.

Accordingly, when injecting the solution, the pressure of the solution acts greatly, and the solution permeates between the components forming the upper plate, for example, the members coupled to the upper plate.

However, according to the separation chip of the present invention, the solution is injected in slope such that the pressure of the solution does not significantly act on the upper plate, the lower plate, or the first member when injecting the solution into the separation chip, thereby increasing the durability of the chip itself.

(2) Smooth flow of the solution in the channel is possible.

According to the related art, there have been cases where the solution does not flow smoothly into the channel, such that a phenomenon in which the solution hovers near an injection hole occurs.

According to the separation chip of the present invention, since the solution is injected slantly and flows through the channel, a directionality of the solution injection may be secured so that the solution may flow smoothly through the channel.

(3) Observation of the solution flow in the chip is easy

The chip according to the related art has the following problems because the tubing is performed in a vertical direction through an injection hole or an outlet.

First, when a lens moves to closely observe the injection hole or the outlet, an interference with the tubing occurs.

To explain in more detail, the tubing is formed of PDMS (polydimethylsiloxane, a type of synthetic lubber material) material, which is generally connected to the channel, and when lens moves to the injection hole or the outlet, interference between the lens and the tubing occurs.

Second, the interference between the lens and the tubing may eventually change or obstruct the flow of the solution in the tubing, or increase the possibility that the tubing departs from the injection hole or the outlet.

On the other hand, a tubing in the separation chip of the present invention fits into a pipe having an acute angle with the upper surface of the upper plate.

Therefore, it is easy to observe at an injection hole or an outlet, and when a lens is located at the injection hole or the outlet, an interference with the tubing does not occur, and thus the flow of solution can be easily observed.

(4) A remaining probability of cells such as blood tumor cells (CTCs) or beads is decreased.

According to the related art, a remaining probability of cells near the injection hole or at the rear (i.e., a rear part) of the injection hole is high.

This is a phenomenon occurring as the solution vertically injected flows into a gap caused from the injection pressure in the chip.

According to the separation chip of the present invention, a vertical pressure hardly acts when injecting the solution.

In addition, since it is possible to eliminate the occurrence of a gap caused from pressure inside the chip when injecting the solution, the remaining probability of cells inside the chip is significantly decreased.

The connection portion 173 is a portion for connecting such that the inner circumferential surface of the pipe portion 172 extends to be connected to the channel 150 so that the fluid supplied from the pipe portion 172 is supplied to the channel. Accordingly, an internal shape of the connection portion 173 may be configured such that the inner circumferential surface of the pipe portion and the channel portion may be smoothly connected, and thereby it is possible to minimize a resistance when supplying the fluid (buffer solution or fine liquid) supplied from the pipe portion to the channel direction (see FIG. 3).

In addition, an upper end of the pipe portion 172 may be cut at the same angle as the upper surface of the upper plate 100 (see FIG. 3). That is, the upper surface of the pipe portion 172 is not cut in a direction perpendicular to the center of the pipe portion, but is cut in a direction horizontal to the upper surface, and thus the upper surface of the pipe portion and the center of the pipe portion may form an acute angle. It is possible thereby to smoothly insert the tubing, and prevent the tubing from departing due to fluid pressure when supplying the fluid to the tubing by increasing the outer surface area of the pipe being in contact with the inner circumferential surface of the tubing.

A stopper portion 174 having a diameter equal to or greater than the tubing is formed on the outer circumferential surface of the pipe portion so that the tubing may be inserted at a predetermined depth. As described above, the pipe portion 172 may be inserted into inside the tubing. In this case, since the lower surface of the pipe portion 172 is in contact with the depression portion 171, the lower surface of the pipe portion 172 may be in contact with the depression portion in a shape forming an acute angle. In this case, when the tubing is inserted, one side of the tubing may contact the surface of the depression portion first, and the other side may be located at the middle of the pipe portion 172. As a result, when the tubing is inserted, the insertion depth of the tubing may not be constant, which may lead to a pressure difference of the fluid supplied to the tubing. Therefore, by forming the stopper portion 174 on the outer circumferential surface of the piper portion, it is possible to constantly maintain the insertion depth of the tubing, and perform an experiment under constant conditions. In this case, the stopper portion 174 may have a diameter that is equal to or greater than the outer circumferential surface of the tubing, and it is formed preferably perpendicular to the center of the pipe portion.

In addition, the coupling portion 170 including the pipe portion 172 may be integrally formed with the upper plate. In the case of a conventional separation chip, the upper plate is manufactured by coupling with a metal pipe portion, which is separately manufactured after the manufacture of the upper plate. In this case, the pipe portion is inserted into a hole formed on the upper plate, and supplies the fluid to the channel direction.

That is, in a conventional disposable separation chip in which a pipe is inserted into a hole a gap may be produced between the inserted pipe and the hole, and thus it needs to perform a waterproof treatment between the pipe and the hole so that sample or buffer solution does not leak. Furthermore, the pipe inserted into the hole is separately manufactured, which may act as a factor that increase the unit cost and the manufacture cost of the disposable separation chip.

However, in the case of the present invention, the upper plate and the coupling portion are integrally manufactured when manufacturing a mold and the number of parts and unit cost of the disposable separation chip may be reduced wherein as the number of the connection portions and the disposable separation chip is reduced, the separation efficiency may be improved (the more connection portions, the more cell loss). In particular, when manufacturing the upper plate of the disposable separation chip using a precision mold, it is possible to improve the stable performance of the separation chip by increasing the surface roughness of all paths through which the sample passes, such as a hole, a pipe, a channel, and the like.

The disposable separation chip includes an upper plate 100 including a channel and a first member 110, and the first member 110 may be coupled to the lower end surface of the upper plate 100.

The upper plate 100 may be manufactured in a shape similar to a rectangular plate having a low height, and the first member 110 may be manufactured in the shape of sheet or film having a very thin thickness compared to the length and width wherein they may be manufactured of various materials such as PEN, PET, PC, etc. depending on the use or the condition.

The disposable separation chip according to the present invention may be manufactured of plastic. Specifically, the upper plate may be manufactured of plastic. The first member and the lower plate may also be manufactured of plastic.

In the present invention, a type of plastic material called polycarbonate (PC) and polymethylmethacrylate (PMMA) is used. The present invention in which the upper plate is manufactured of plastic material has the following advantages.

(1) A conventional chip for separating or capturing fine particles depends on the MEMS technique manufacturing method.

However, the present invention is a general manufacturing method using a plastic material, and thus the manufacturing process is simple.

(2) Compared to the conventional MEMS technique manufacturing method, mass production is possible, and various materials of plastic (resin) series may be used.

(3) Not only mass production is possible, but also quality consistence may be promoted.

(4) It is relatively easy to handle because plastic (resin)-based materials are used.

The upper plate and the first member may be coupled by various methods such as (1) high frequency welding (2) ultrasonic welding (3) thermal fusion.

The coupling portion located in the separation chip will be described based on an embodiment as follows.

First, a mixed solution injection hole through which a mixed solution is injected and a buffer solution injection hole through which buffer solution such as saline solution is injected are located on one side of the upper plate. In addition, a magnetic bead discharge hole through which magnetic beads are discharged and other particle discharge hole through which other particles are discharged are located on the other side of the upper plate in the coupling portion located in the separation chip of the present invention. The plurality of coupling portions are formed to be connected to the channel, and the coupling portion may be integrally manufactured with the upper plate as described above.

A hole **220*a* through which a sample (microfluid including blood) is injected and a hole 220*b*** through which a buffer solution such as a saline solution is injected may be located on one side of the upper plate.

A hole **220*c* through which a separated sample is discharged and holes 220*d* and 220*e* through which the buffer solution including other samples is discharged are located on the other side of the upper plate 450**.

The plurality of holes **220*a* to 220*e* are formed to be connected to the channel, and the pipe 170 is positioned in the holes 220*a* to 220*e*** in an integrated shape.

In addition, a wire pattern may be disposed at a specific position of the channel 150 as a hole for alignment with a wire pattern chip.

The wire pattern is formed to have a parabolic shape from one side to the other side of the lower chip.

Specifically, the wire pattern is located at a third channel, which is a part of the channel where cell separation is performed.

The wire pattern is located from a starting point to an end point of the third channel wherein a parabolic shape is formed from one side to the other side of the lower chip, that is, it can be said that the vertex of the wire pattern is formed close to the end point of the third channel.

Hereinafter, the channel of the present invention will be described.

The disposable separation chip according to the present invention includes a channel 150 formed on the lower surface of an upper plate 100, wherein the channel 150 may be formed by engraving the lower surface of the upper plate in a concave shape.

The existing channel is formed by manufacturing the lower surface of the upper plate to be flattened and deleted in a channel shape, and then attaching a member that was engraved in a conduit shape on one side. However, in this case, defects may occur depending on the position where the member is attached, and a phenomenon may occur that a leakage occurs in the portion connecting the upper plate and the member, or cells are attached thereto and thus lost. In this regard, the present invention enables the formation of the channel only by coupling the first member to the lower surface of the upper plate on which a channel-shaped intaglio is formed, thereby fundamentally preventing the loss or leakage of the cells.

However, when forming the channel on the lower surface of the upper plate as in the present invention, leakage of the channel may be determined depending on the coupling force between the first member and the lower plate. In the case of the existing invention, since the upper plate is manufactured in a plane shape, when coupling the upper plate and the lower plate, there is a case in which the coupling force of the central portion has decreased, thereby resulting in the occurrence of leakage.

In the case of the present invention, since the lower surface of the upper plate is manufactured as a curved surface of which a radius of curvature is 500 to 1000 mm, the thickness of a central portion is thicker than the thickness of both side surfaces, and thus when pressing an edge portion for coupling the upper plate and the second plate, the central portion in which the channel is formed is pressed, thereby minimizing defects due to leakage.

When the radius of curvature is less than 500 mm, since the central portion of the upper plate protrudes too much compared to the both side surfaces, coupling of the side surface portions may not be perfect when pressed, and when the radius of curvature exceeds 1000 mm, there is little difference between the central portion and the side surface portion in height, and thus the effect of pressing may decrease.

In addition, in the case of deformation by pressing, the channel located at the center may also be deformed, and considering this, it is preferable to form the central portion of the channel to be shallow when forming the channel.

A pressing means for compressing the separation chip to the direction of the lower chip may be included at the upper and lower ends of both side surfaces of the upper plate. The pressing means presses the upper plate to the direction of the lower plate. In a case where the upper plate is formed as a curved surface in which a channel is formed between the upper and lower plates, the pressing means presses the upper plate to the direction of the lower plate, and at the same time allows the lower surface of the upper plate to be a straight shape wherein it more presses the channel portion than the side surface portion of the upper plate. The pressing means may be used without limitation as long as the lower plate is coupled by pressing the upper plate, and preferably, and the pressing means may be a bolt and nut, clamp, or press that presses the upper surface of the upper plate downward and the like.

Hereinafter, the present invention will be described based on the channel.

In the separation chip according to Embodiment 1 of the present invention, a channel formed on the lower side of the upper plate may be formed as below (see FIG. 6).

First, a first channel 151 connected to an injection hole 220*a* is located at the center of the upper plate 100 based on the width direction of the upper plate 100, and may be formed at one side of the upper plate 100 based on the length direction of the upper plate 100.

In this case, one side 151*a* of the first channel may be connected to an injection coupling portion 220*a*.

A second channel 152 includes a plurality of branched channels, and the branched channel located above based on the width direction of the upper plate will be described in the following description.

First, the second channel 152 may include a first portion 152*a* and a second portion 152*b*. The first portion 152*a* of the second channel 152 may be extended to have a predetermined length upward on the right side of the first channel 151. The second portion 152*b* of the second channel 152 is connected to the first portion 152*a* of the second channel 152, and may be extended downward on the right side of the other side of the first portion 152*a* of the second channel to have a predetermined length.

Meanwhile, the first portion 152*a* of the second channel may be formed to increase gradually its width as it approaches closely to the second portion 152*b* of the second channel 152. On the other hand, the second portion 152*b* of the second channel may be formed to decrease gradually its width as it approaches closely to a third channel 153 being connected to the second portion 152*b* of the second channel.

That is, when expanding the channel at a portion where the other side of the first portion 152*a* is connected to the one side of the second portion 152*b* of the second channel, and where the channel is bent such that the flow of a solution can be changed, it is possible to aim for a redistribution effect in which the cells in the solution are widely spread as a whole by using the vortex phenomenon.

If the width of the second channel 152 is maintained constantly, since the cells are moved only to one wall of the channel after having passed through the portion where the other side of the first part 152*a* of the second channel and the one side of the second part 152*a* of the second channel are connected, i.e. the portion where the channel is bent, the redistribution effect may not appear or may be reduced.

The separation chip according Embodiment 2 of the present invention including a channel formed on the lower side of the upper plate may be formed as follows (see FIG. 7).

First, a first channel 151 being connected to an injection hole 220*a* is located at the center of the upper plate 100 based on the width direction of the upper plate 100, and may be formed at one side of the upper plate 100 based on the length direction of the upper plate 100. For reference, it is preferable that the first channel 151 is formed to be shorter in length than the second channel 152.

The second channel 152 being connected to the first channel 151 includes a plurality of branched channels. In this case, the second channel 152 may be formed to have an arc shape as shown in the drawing. In addition, the second channel 152 is located above and below the center of the upper plate 100 based on the width direction of the upper plate 100, and may be branched into a plurality of channels.

In this case, when viewed from the center of the width of the upper plate 100, two or more branched channels may be provided above and two or more branched channels may be provided below.

The separation chip according to Embodiment 3 of the present invention including a channel formed on one side of the upper plate may be formed as follows (see FIGS. 8 and 9).

A plurality of branched channels forming the second channel 152 may be combined into one before some of the branched channels becomes connected to the third channel 153. That is, hereinafter, the second channel will be described based on the case in which the second channel is located above and below the center of the upper plate 100 based on the width direction of the upper plate 100, and in this case, when viewed from the center of the width of the upper plate, two branched channels are provided above and also two branched channels are provided below.

Hereinafter, the branched second channel 152 is referred to as a 2-1 channel 1521 to a 2-4 channel 1524.

First, a part of the 2-1 channel 1521 and a part of the 2-2 channel 1522 are combined each other before the 2-2 channel 1522 becomes connected to a third channel 153 and thus form one channel.

Specifically, the part of the 2-1 channel means a part adjacent to the third channel among the 2-1 channel. Likewise, a part 1522*b* of the 2-2 channel means a part adjacent to the third channel 153 among the 2-2 channel 1522.

As such, a part 1521*b* of the 2-1 channel and a part 1522*b* of the 2-2 channel are combined into one and then may be connected to the third channel 153.

The separation chip 10 according to the present invention includes a filter that may be located on the channel 150.

According to the embodiment of the present invention, a filter may be located on a first channel 151 or a second channel 152. For example, a plurality of filters may be located on the second channel 152, and specifically, the filters may be located on a first portion 152*a* of the second channel and a second portion 152*b* of the second channel, respectively. Of course, one or more filters may be located on the first channel 151 as well.

In the disposable separation chip 10 according to the present invention, the filter is connected to the channel 150, and has a predetermined space.

In this case, the filter performs the following roles.

When the injected solution passes through the filter, gas (air) contained in a solution may be removed. That is, a removal method based on the specific gravity of the solution and the gas is selected.

The gas located above the solution due to the difference in specific gravity when a solution containing gas passes through the filter is connected to the channel, and is trapped in the filter having a predetermined space, so that the gas contained in the solution is removed. Accordingly, when viewed from the cross-section of the disposable separation chip 10 according to the present invention, it is preferable that the filter is located on the upper part of the channel 150.

A protrusion 180 may be located in the separation chip 10 of the present invention (see FIG. 10).

The channel 150 formed in the separation chip 10 of the present invention may include the first channel 151. In addition, the channel 150 is connected to the first channel 151, and may include the second channel (152) branched in plural. In this case, a plurality of protrusions 180 may be located on the first channel 151 or the second channel 152.

Hereinafter, the case in which the protrusion 180 is formed on the first channel 151 will be described.

The protrusion 180 may be located on the lower portion of the upper plate in which the channel 150 is formed. That is, it has been described above that to form the channel 150 on the lower portion of the upper plate, a concave groove may be formed on a portion of the upper plate.

In this case, to form the protrusion 180 on the channel 150, a concave groove may be formed in the remaining part except for the protrusion 180 in the width of the first channel 151. At this time, even in the case of the protrusion, a part of the protrusion is cut to form a groove through which a fluid can flow at the lower portion, but it may be manufactured in a shape in which a protrusion is formed at the upper portion.

The roles of the protrusion 180 are as below. The present invention is described based on a case in which a plurality of protrusions 180 are formed on the first channel 151.

The distance between one protrusion and the other adjacent protrusion may be formed to be smaller than the size of air particle mixed in the solution.

As such, when the distance between one protrusion and the other adjacent protrusion is formed to be smaller than the size of the air particle, it is possible to prevent air particles mixed in the solution from flowing into the channel 150 when injecting the solution into the channel 150. In particular, in the case of the present invention, the protrusion is located in the upper portion of the channel, thereby effectively removing air particles located in the upper portion due to the different in specific gravity.

In the separation chip 10 of the present invention, the protrusion 180 described above may has various shapes, such as rectangle, circle, or rhombus, within a range capable of filtering air particles.

In addition, the protrusion 180 located in the first channel 151 or the second channel 152 may also be formed to have not only one row but also two or more rows. That is, the protrusion 180 may include a first protrusion and a second protrusion located below or in a side of the first protrusion.

The present invention further provides a microfluidic based diagnostic system including the disposable separation chip.

The microfluidic based diagnostic system may include a fluid supplying portion for supplying a buffer solution or a microfluid; a microfluid bubble trap for removing bubbles contained in a fluid supplied from the fluid supplying portion; a disposable separation chip for mixing or separating the fluid passing through the microfluid bubble trap; a diagnosing means for analyzing the microfluid passing through the separation chip; and a diagnostic system control device for controlling the diagnostic system.

The fluid supplying portion 1000 is provided with a pump for supplying the microfluid and a tube and valve for transporting the fluid, and may perform stable fluid supply through appropriate flow rate control.

The bubble trap 2000 is provided with a bubble trap body, an inlet and an outlet, and may prevent microbubbles from flowing into the channel by trapping the microbubbles introduced from the fluid supplying unit 1000 inside the bubble trap.

The separation chip 3000 is manufactured of materials such as plastic or plastic and glass (ceramic), which is composed of an inlet through which fluid is introduced, an outlet, a fine channel, and the like, and may be able to perform separation, measurement, incubation, and analysis.

The diagnosing means 4000 is provided with an optical system including a fluorescence system and high-performance camera, and may perform fluorescence analysis, single cell analysis, protein analysis, and the like.

The diagnostic system control device 5000 is provided with a hardware including a central processing unit (CPU) and input/output devices (e.g., flow rate sensor, pinch valve, touch interface, etc.), and may control communication and tuning between each input/output device and perform analysis on data collected from a diagnosis means 4000.

The microfluidic based diagnostic system of the present invention may include a separation chip 3000. As described above, the accuracy of the diagnostic system based on microfluid may be greatly influenced by the presence or absence of bubbles in the microfluid. Therefore, in the present invention, the bubbles of fluid are removed using a bubble trap 2000 and supplied to the separation chip 3000, thereby greatly improving the reliability of the diagnostic system (see FIG. 11).

Since the present invention has been described for specific parts in detail, it will be apparent to those skilled in the art that this specific technology is only a preferred embodiment, and thus the scope of the present invention is not limited thereto. Therefore, it will be said that substantial scope of the present invention is defined by the appended claims and the equivalents thereof.

The invention claimed is:

1. A disposable separation chip comprising:

a lower chip on which a wire pattern having a parabolic shape from one side to another side thereof is formed; and a separation chip separable from the lower chip, wherein the separation chip comprises:

an upper plate having a coupling portion for connection to a tubing; and a first member disposed under the upper plate and coupled to a lower surface of the upper plate, wherein the coupling portion comprises:

a depression portion formed on an upper surface of the upper plate;

a pipe portion entirely located within the depression portion and configured to be inserted into the tubing; and a connection portion that connects an inner circumferential surface of the pipe portion to a channel, wherein the pipe portion forms an acute angle with respect to the upper surface of the upper plate, an upper end of the pipe portion comprising a cut edge parallel with the upper surface of the upper plate, and a stopper portion having a diameter equal to or greater than the tubing is formed perpendicular to a center axis of the pipe portion such that the tubing is inserted at a constant depth, wherein the depression portion, the pipe portion, and the connection portion are integrally formed with the upper plate such that the coupling portion extends from the upper surface to the lower surface of the upper plate to be connected to the channel, and wherein the height of the upper end of the pipe portion is equal to the upper surface of the upper plate.

2. A microfluidic based diagnostic system comprising the disposable separation chip of claim 1.

3. The microfluidic based diagnostic system of claim 2, comprising:

a fluid supplying portion for supplying a buffer solution or a microfluid;

a bubble trap for removing bubbles included in the fluid supplied from the fluid supplying portion;

a disposable separation chip for mixing or separating the fluid passing through the bubble trap;

a diagnosing means for analyzing the microfluid passing through the separation chip; and a diagnostic system control device for controlling the diagnostic system.

4. A disposable separation chip comprising:

a lower chip on which a wire pattern having a parabolic shape from one side to another side thereof is formed; and a separation chip separable from the lower chip, wherein the separation chip comprises:

an upper plate on which a coupling portion coupled to a tubing is formed; and a first member disposed under the upper plate and coupled to a lower surface of the upper plate, wherein the coupling portion comprises:

a depression portion formed on an upper surface of the upper plate;

a pipe portion entirely located within the depression portion and configured to be inserted into the tubing; and a connection portion that connects an inner circumferential surface of the pipe portion to a channel, wherein the pipe portion forms an acute angle with respect to the upper surface of the upper plate, an upper end of the pipe portion comprising a cut edge parallel with the upper surface of the upper plate, and a stopper portion having a diameter equal to or greater than the tubing is formed perpendicular to a center axis of the pipe portion such that the tubing is inserted at a constant depth, wherein the depression portion, the pipe portion, and the connection portion are integrally formed with the upper plate such that the coupling portion extends from the upper surface to the lower surface of the upper plate to be connected to the channel formed as a groove on a lower portion of the upper plate, and wherein the height of the upper end of the pipe portion is equal to the upper surface of the upper plate.

5. The disposable separation chip of claim 4, wherein the lower surface of the upper plate is produced as a curved shape of which a radius of curvature is 500 to 1000 mm wherein a thickness of a center portion is thicker than opposite side surfaces thereof.

6. The disposable separation chip of claim 5, wherein a pressing means for compressing the separation chip toward the lower chip is included at an upper end and a lower end of the opposite side surfaces of the upper plate.

7. The disposable separation chip of claim 4, wherein the channel comprises:

a first channel; and a second channel being connected to the first channel, being branched into multiple, and including a first portion and a second portion being connected to the first portion, wherein a width of the first portion increases gradually toward the second portion, and wherein a width of the second portion decreases gradually toward a third channel being connected to the second channel.

8. The disposable separation chip of claim 4, wherein the channel comprises:

a first channel; and a second channel being connected to the first channel and being branched into multiple, wherein the second channel is formed with an arc shape.

9. The disposable separation chip of claim 4, wherein the channel comprises:

a first channel; and a second channel being connected to the first channel and being branched into multiple, wherein a plurality of protrusions is disposed on the first channel or the second channel.

10. The disposable separation chip of claim 9, wherein the protrusion comprises a first protrusion and a second protrusion located below or at a side of the first protrusion.

11. The disposable separation chip of claim 4, wherein a filter is disposed on the channel.

12. The disposable separation chip of claim 11, wherein the filter is connected to the channel and has a predetermined space.

13. A disposable separation chip comprising:

a lower chip on which a wire pattern having a parabolic shape from one side to another side thereof is formed; and a separation chip separable from the lower chip, wherein the separation chip comprises:

an upper plate on which a coupling portion coupled to a tubing is formed; and a first member disposed under the upper plate and coupled to a lower surface of the upper plate, wherein the coupling portion comprises:

a depression portion formed on an upper surface of the upper plate;

a pipe portion entirely located within the depression portion and configured to be inserted into the tubing; and a connection portion that connects an inner circumferential surface of the pipe portion to a channel, wherein the pipe portion forms an acute angle with respect to the upper surface of the upper plate, an upper end of the pipe portion comprising a cut edge parallel with the upper surface of the upper plate, and a stopper portion having a diameter equal to or greater than the tubing is formed perpendicular to a center axis of the pipe portion such that the tubing is inserted at a constant depth, wherein the depression portion, the pipe portion, and the connection portion are integrally formed with the upper plate such that the coupling portion extends from the upper surface to the lower surface of the upper plate to be connected to the channel formed as a groove on a lower portion of the upper plate, and wherein the height of the upper end of the pipe portion is equal to the upper surface of the upper plate, and wherein the lower chip and the separation chip are made of plastic.

14. The disposable separation chip of claim 13, wherein the plastic is a transparent polycarbonate.

* * * * *